: US 8,500,842 B2
(45) Date of Patent: Aug. 6, 2013

(12) United States Patent
Blennow et al.

(54) CERIA AND STAINLESS STEEL BASED ELECTRODES

(75) Inventors: Peter Blennow, Malmö (SE); Mogens Mogensen, Lynge (DK)

(73) Assignee: Technical University of Denmark, Lyngby (DK)

( * ) Notice: Subject to any disclaimer, the term of this patent is extended or adjusted under 35 U.S.C. 154(b) by 1049 days.

(21) Appl. No.: 12/199,571

(22) Filed: Aug. 27, 2008

(65) Prior Publication Data

US 2009/0061272 A1 Mar. 5, 2009

(30) Foreign Application Priority Data

Aug. 31, 2007 (DK) .................. 2007 01245

(51) Int. Cl.
*C22C 33/02* (2006.01)
*H01M 4/02* (2006.01)

(52) U.S. Cl.
USPC ............ 75/235; 75/246; 429/423; 429/221; 252/521.1; 252/521.2

(58) Field of Classification Search
USPC .................. 75/232, 235, 246; 419/2, 27, 40; 429/218.1, 221
See application file for complete search history.

(56) References Cited

U.S. PATENT DOCUMENTS

| | | | | |
|---|---|---|---|---|
| 3,377,265 A | * | 4/1968 | Caesar | 204/290.03 |
| 4,902,587 A | * | 2/1990 | Saitoh et al. | 429/514 |
| 4,943,496 A | * | 7/1990 | Okada et al. | 429/454 |
| 5,312,582 A | * | 5/1994 | Donado | 419/19 |
| 5,350,641 A | | 9/1994 | Mogensen et al. | |
| 6,682,842 B1 | * | 1/2004 | Visco et al. | 429/482 |
| 6,752,979 B1 | | 6/2004 | Talbot et al. | |
| 2004/0185327 A1 | | 9/2004 | Gorte et al. | |
| 2005/0221163 A1 | | 10/2005 | Yang et al. | |

FOREIGN PATENT DOCUMENTS

| | | |
|---|---|---|
| EP | 1 760 817 A1 | 3/2007 |
| WO | WO 2005/122300 | 12/2005 |
| WO | WO 2006/074932 A1 | 7/2006 |
| WO | WO 2006/082057 A2 | 8/2006 |
| WO | WO 2006/116153 | 11/2006 |
| WO | WO 2007/025762 A2 | 3/2007 |

OTHER PUBLICATIONS

J. Qiao et al., "Ni/YSZ and Ni-CeO$_2$/YSZ Anodes Prepared by Impregnation of a Solid Oxide Fuel Cell," *Journal of Power Sources*, vol. 169, No. 2, pp. 253-258 (2007).
M. Lundberg et al., "Mesoporous Thin Films of High-Surface-Area Crystalline Cerium Dioxide," *Microporous and Mesoporous Materials*, vol. 54, pp. 97-103 (2002).
M. Mogensen et al., "Physical, Chemical and Electrochemical Properties of Pure and Doped Ceria," *Solid State Ionics*, 129, pp. 63-94 (2000).
M. Morgensen et al., "Factors controlling the oxide ion conductivity of fluorite and perovskite structured oxides," *Solid State Ionics*, 174, pp. 2790286 (2004).

* cited by examiner

*Primary Examiner* — Roy King
*Assistant Examiner* — Ngoclan T Mai
(74) *Attorney, Agent, or Firm* — Dickstein Shapiro LLP

(57) ABSTRACT

A cermet anode structure obtainable by a process comprising the steps of: (a) providing a slurry by dispersing a powder of an electronically conductive phase and by adding a binder to the dispersion, in which said electronically conductive phase comprises a FeCrMx alloy, wherein Mx is selected from the group consisting of Ni, Ti, Nb, Ce, Mn, Mo, W, Co, La, Y, Al, and mixtures thereof, (b) forming a metallic support of said slurry of the electronically conductive phase, (c) providing a precursor solution of ceria, said solution containing a solvent and a surfactant, (d) impregnating the structure of step (b) with the precursor solution of step (c), (e) subjecting the resulting structure of step (d) to calcination, and (f) conducting steps (d)-(e) at least once.

11 Claims, 10 Drawing Sheets

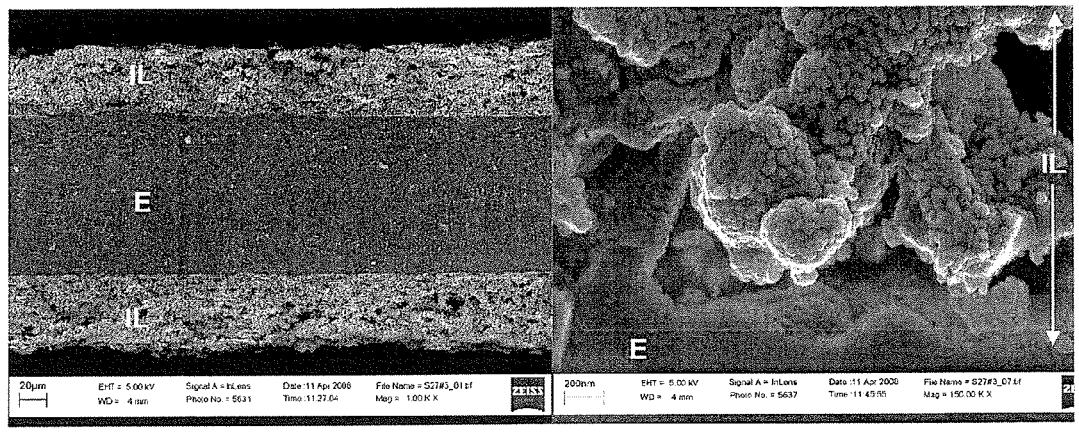
FIG. 10 A,B

CERIA AND STAINLESS STEEL BASED ELECTRODES

FIELD OF THE INVENTION

The present invention relates to solid oxide fuel cells (SOFC) comprising metal supported composite anodes. Particularly the invention relates to cermet anode structures containing an electronic conductive phase of iron-chrome alloy, e.g. stainless steel, and a ceria based oxide phase finely dispersed within said electronic conductive phase. More particularly, the invention relates to stainless steel composite anodes containing a gadolinium-doped ceria phase (CGO) of nano-sized ceria crystallites dispersed therein.

BACKGROUND OF THE INVENTION

In order to be useful in fuel cells such as Solid Oxide Fuel Cells (SOFCs), anodes (fuel electrodes) must possess a high performance in terms of high electrochemical activity and high redox stability. Current state of the art Ni—YSZ anodes provide a reasonable electrochemical activity at high operating temperatures, often above 800° C., but are normally not redox stable. Volume changes in Ni—YSZ anodes due to reduction and oxidation of Ni results in inexpedient mechanical stresses in the anode material which impair the performance of the fuel cell.

In "Ni/YSZ and Ni—CeO2/YSZ anodes prepared by impregnation of a solid oxide fuel cell", Journal of Power Sources, Qiao et al. disclose the preparation of Ni—CeO$_2$/YSZ anodes by tape casting and vacuum impregnation. The addition of CeO$_2$ is said to enhance cell performance.

U.S. Pat. No. 5,350,641 Mogensen et al. discloses the use of CeO$_2$-based ceramics as the anode in a fuel cell.

U.S. Pat. No. 6,752,979 Talbot et al. discloses the preparation of nano-sized ceria particles with templating surfactants. The removal of the surfactant and attendant formation of nano-sized particles having grain sizes of 2-10 nm is effected by calcination at e.g. 300° C.

In "Mesoporous thin films of high-surface-area crystalline cerium dioxide", Microporous and Mesoporous Materials 54 (2002), 97-103, Lunderg et al. disclose the formation of nano-sized ceria particles by the removal of templating surfactant during calcination at about 400° C.

According to conventional preparation methods, metal supported cells have been manufactured by co-sintering of a metal support tape in contact with a Ni-containing anode tape. This has resulted in extensive alloying/mixing of Ni, Cr, and Fe in the anode layer directly dependent on the sintering temperature. Co-firing a Ni-based anode at high temperature in reducing atmosphere also leads to coarsening of the Ni particles to unacceptably large particle size. This can result in poor performance of the catalyst and changes in the thermal expansion coefficient, mechanical properties or oxidation resistance of the metal support. Additionally, this type of anode layer partially oxidises under operating conditions and leads subsequently to expansion of the anode layer and eventually electrolyte rupture.

WO-A-2005/122300 describes metal supported anode structures manufactured from powder suspensions containing FeCr alloy, a layer for anode impregnation comprising ScYSZ and FeCr alloy, an electrolyte layer. The thus obtained half-cells are sintered and a solution of Ni, Ce, Gd nitrates is impregnated into the anode layer by vacuum infiltration thus resulting in an anode containing 40 vol % Ni. A cathode layer is subsequently deposited on the electrolyte surface.

WO-A-2006/116153 discloses a method of forming a continuous network of fine particles on the pore walls of a porous structure in a single step by removing the solvent of a solution containing a metal salt, surfactant and solvent prior to infiltration. The removal of the solvent is conducted by heating.

SUMMARY OF THE INVENTION

A metal supported fuel cell with a more stable structure has been produced. The cell design is based upon the creation of an active anode structure by impregnation of the metal support directly with nano-structured doped-ceria and with the resulting anode containing below 10 wt % Ni.

We have found that apart from preventing the undesired expansion of the anode and thereby poor stability, unexpectedly high performance, i.e. high electrochemical activity at a wide range of temperatures is obtained with a novel cermet electrode obtainable by a process in which nano-sized ceria particles are provided in an electronically conductive phase of a FeCrMx alloy as set out below.

Hence, according to the invention we provide a cermet anode structure obtainable by a process comprising the steps of:
(a) providing a slurry by dispersing a powder of an electronically conductive phase and by adding a binder to the dispersion, in which said electronically conductive phase comprises a FeCrMx alloy, wherein Mx is selected from the group consisting of Ni, Ti, Nb, Ce, Mn, Mo, W, Co, La, Y, Al and mixtures thereof,
(b) forming a metallic support layer of said slurry of the electronically conductive phase,
(c) providing a precursor solution of ceria, said solution containing a solvent and a surfactant,
(d) impregnating the structure of step (b) with the precursor solution of step (c),
(e) subjecting the resulting structure of step (d) to calcination, and
(f) conducting steps (d)-(e) at least once,
the process further comprising combining the precursor solution of ceria with a nickel precursor solution and wherein the total amount of nickel in the resulting anode is 10 wt % or below.

The forming of a metallic support layer in step (b) may be conducted by for instance tape-casting the slurry of the electronically conductive phase and then sintering.

In a preferred embodiment, an electrolyte, i.e. an oxygen ion conducting phase, such as yttrium stabilized zirconia (YSZ) or scandium-yttrium stabilized zirconia (ScYSZ) is also provided on the anode structure by forming said electrolyte on the metallic support layer containing the electronically conductive component. The invention encompasses therefore also a cermet anode structure further comprising an electrolyte obtainable by a process comprising the steps of:
(a) providing a slurry by dispersing a powder of an electronically conductive phase and by adding a binder to the dispersion, in which said electronically conductive phase comprises a FeCrMx alloy, wherein Mx is selected from the group consisting of Ni, Ti, Nb, Ce, Mn, Mo, W, Co, La, Y, Al and mixtures thereof,
(b) forming a metallic support layer of said slurry of the electronically conductive phase,
(c) forming an electrolyte on the structure of step (b) and sintering the obtained structure,
(d) providing a precursor solution of ceria, said solution containing a solvent and a surfactant,
(e) impregnating the resulting sintered structure of step (c) with the precursor solution of step (d), (f) subjecting the structure of step (e) to calcination, and
(g) conducting steps (e)-(f) at least once,
the process further comprising combining the precursor solution of ceria with a nickel precursor solution and wherein the total amount of nickel in the resulting anode is 10 wt % or below.

The provision of the electrolyte is one extra step towards a full electrochemical device such as a solid oxide fuel cell (SOFC) and solid oxide electrolysis cell (SOEC); what is missing is simply another electrode such as a cathode in a SOFC on the other side of the electrolyte.

In a preferred embodiment, the electronically conductive phase in step (a) of any of the above embodiments also contains initially an additional oxygen ion conducting phase, e.g. yttrium stabilized zirconia (YSZ) (that is, an oxygen ion conductive phase in combination with an electronically conductive phase), or mixed oxygen ion and electronically conducting phase, e.g. Gd-doped ceria (CGO ($Ce_{1-x}Gd_xO_{2-\delta}$)) (that is, a mixed oxygen ion and electronically conductive phase in combination with an electronically conductive phase). Thus, the metal support may be provided with about 20 vol % YSZ (20 vol % 50/50 1 μm/7 μm YSZ) thereby forming a composite with the whole metallic support e.g. a composite formed by mixing powders of the FeCrMx alloy and oxygen ion conducting phase. It would be understood that while YSZ only conducts oxygen ions, CGO is a mixed conductor, i.e. conducting both oxygen ions and electrons, in reducing atmospheres, such as those prevailing in the anode compartments of SOFCs. The electronically conductive phase may also contain initially other additives, in particular pore formers, such as carbonaceous materials that can be removed upon heat treatment.

In the embodiment with the electrolyte formed on the metallic support layer, this metallic support is preferably formed by tape-casting the slurry of the electronically conductive phase. One or more sintering steps may also be conducted in order to form the sintered metallic support. In one particular embodiment the electrolyte is applied on a metallic support and then co-sintered, wherein the electronically conductive phase serves as current collector. The thus resulting metallic support is sintered to provide a supported structure where the electrolyte, for instance TZ8Y (Tosoh) or ScYSZ forms a thin layer of about 10 μm, while the thickness of the metallic support comprising only the electronically conductive current collector phase may advantageously be in the range 100-300 μm.

As used herein the term "cermet" means ceramic-metal composite, i.e. a combination of ceramic and metal.

As used herein the term "powder" defines a collection of particles with a mean particle diameter in the range 0.2-100 μm, preferably 0.1-10 μm, such as about 0.2, 0.5, 1.0 or 5 μm.

In this specification the terms "phase" and "component" are used interchangeably, thus an electronically conductive phase has the same meaning as electronically conductive component. It is also apparent that the terms "electrolyte" and "oxygen ion conductive phase" are used interchangeably throughout the specification. Further the terms "mixed oxygen ion and electronically conductive phase" and "mixed conductive phase" have the same meaning and are used interchangeably.

As used herein the term "metallic support layer" serves to define the electronically conductive phase of FeCrMx alloy, optionally mixed initially with an oxygen ion conductive phase or a mixed oxygen ion and electronically conductive phase, which results from sintering, tape-casting or tape-casting and sintering of the slurry containing the electronically conductive phase. The metallic support may further be provided with an electrolyte layer and/or impregnation layer applied thereon, as set out below.

The term "resulting anode" includes the metallic support and the optional impregnation layer, as these are part of the anode side of a final cell, but it does not include the electrolyte.

Hence, in yet another embodiment, an impregnation layer comprising a metal, cermet, ceramic or a ceramic composite is provided after forming said metallic support layer, before applying the electrolyte and before impregnation with the precursor solution of ceria. Accordingly, the metallic support is processed as a graded structure. Said impregnation layer is preferably a metal, a cermet, a ceramic or a ceramic composite consisting of an electronically conductive phase, or an oxygen ion conducting phase, e.g. YSZ, or a mixed conducting phase, e.g. CGO ($Ce_{1-x}Gd_xO_{2-\delta}$), or mixed conducting phase in combination with an electronically conductive phase, e.g. CGO/FeCrMx, or an oxygen ion conducting phase in combination with an electronically conductive phase, e.g. YSZ/FeCrMx.

First, the electronically conductive phase, which initially can contain an additional oxygen ion conducting phase or mixed conductive phase as said above is formed as a metallic support layer by for instance tape-casting. Then the impregnation layer is provided by applying on the metallic support a metal, a cermet, a ceramic or a ceramic composite consisting of an electronically conductive phase or an oxygen ion conducting phase, e.g. YSZ, or a mixed conducting phase, e.g. CGO ($Ce_{1-x}Gd_xO_{2-\delta}$), or mixed conducting phase in combination with an electronically conductive phase, or an oxygen ion conducting phase in combination with an electronically conductive phase. Here, the electronically conductive phase is selected from the group consisting of FeCrMx alloy, niobium-doped strontium titanate, vanadium-doped strontium titanate, tantalum-doped strontium titatane and mixtures thereof. Preferably the impregnation layer contains about 50 vol % CGO ($Ce_{1-x}Gd_xO_{2-\delta}$) and 50 vol % electronically conductive component, but other fractions like 20% CGO and 80% can also be used. The metal, cermet, ceramic, or ceramic composite forms an impregnation layer 10-50 μm thick, often about 20 μm thick which is useful for both the embodiment without the electrolyte formed on the metallic support according to claim 1 and the embodiment with the electrolyte formed thereon according to claim 2 particularly for the latter as described below. In the former the impregnation layer is applied after forming the metallic support but before impregnating the structure with ceria.

Accordingly, for either embodiment with or without the electrolyte formed on the metallic support layer, step (b) may further comprise providing an impregnation layer wherein said impregnation layer consists of an electronically conductive phase, or an oxygen ion conducting phase, e.g. YSZ, or a mixed conducting phase, e.g. CGO ($Ce_{1-x}Gd_xO_{2-\delta}$), or mixed conducting phase in combination with an electronically conductive phase, or an oxygen ion conducting phase in combination with an electronically conductive phase, in which the electronically conductive phase is selected from the group consisting of FeCrMx alloy, niobium-doped strontium titanate, vanadium-doped strontium titanate, tantalum-doped strontium titatane, and mixtures thereof.

The provision of the impregnation layer enables a better attachment of the metallic support to the electrolyte, higher ionic conductivity close to the electrolyte and facilitates the subsequent impregnation with the ceria solution by having improved porosity close to the electrolyte and thereby forming a composite with the whole metal support.

According to the invention the ceria solution is impregnated into the metallic support and a calcination is conducted in order to in-situ form nano-sized ceria particles/crystallites that cover the surfaces of said metallic support and the optional impregnation layer. The nano-sized ceria particles become finely dispersed within the metallic support of the FeCrMx alloy (e.g. stainless steel), thereby completely covering the FeCrMx alloy particles and optionally the other surfaces of the metallic support, such as the surfaces of the oxygen ion conducting phase, e.g. YSZ, initially present together with the electronically conductive phase as well as the surfaces of the impregnation layer as described above.

By the term "in-situ" is meant during operation or as the process of preparation of the anode structure is being conducted.

By the term "nano-sized ceria particles or crystallites" is meant particles having grain size (average particle diameter) of 1-100 nm, preferably 1 to 50 nm, for instance 5 to 40 nm, such as 5 to 20 nm.

The impregnation is preferably conducted under vacuum to ensure the penetration of the ceria precursor solution containing a surfactant into the porosities of the metallic support and into the optional impregnation layer.

The nano-sized ceria particles are formed by removal of a templating surfactant. The particles form a nano-sized surface structure which combined with the high electrical conductivity of the electronically conductive phase, results in a surprisingly high electrochemical activity (low polarization resistance) at a wide range of temperatures.

The provision of an electronically conductive phase in the form of a FeCrMx alloy, e.g. stainless steel, results in the formation of a metallic support layer with a porous volume of below 70 vol %, often in the range 10-60 vol %, and an average pore size of 1-50 μm, preferably 2-10 μm. The porous metallic support layer enables the transport of gases. The FeCrMx alloy may also comprise from about 0 to about 50 vol % metal oxides, wherein the metal oxide is selected from the group of doped zirconia, doped ceria, Mg/Ca/SrO, $CoO_x$, $MnO_x$, $B_2O_3$, $CuO_x$, $ZnO_2$, $VO_x$, $Cr_2O_3$, FeO, $MoO_x$, $WO_3$, $Ga_2O_3$, $Al_2O_3$, $TiO_2$, $Nb_2O_5$ and mixtures thereof. The addition of one or more of said oxides contributes to the adjustment of the TEC (thermal expansion coefficient) of the formed metallic support layer with the other layers formed in the anode structure so as to reduce the TEC difference thereof. Also, said oxides may be used to control the sinterability and grain growth of the layer. In the case of for example Mg/Ca/SrO or $CoO_x$ the TEC will increase, whereas in case of, for example, $Cr_2O_3$, $Al_2O_3$, $TiO_2$, zirconia and possibly ceria the TEC will be reduced. Thus, the addition of the respective oxide can be used to control the TEC difference as desired.

In a further preferred embodiment, the FeCrMx porous support layer comprises an oxide layer on all internal and external surfaces. Said oxide layer may be formed by oxidation of the FeCrMx alloy itself in a suitable atmosphere. Alternatively, the oxide layer may be coated on the alloy. The oxide layer advantageously inhibits the corrosion of the metal. Suitable oxide layers comprise, for example, $Cr_2O_3$, $CeO_2$, $LaCrO_3$, $SrTiO_3$ and mixtures thereof. The oxide layer may preferably furthermore be suitably doped, e.g. by alkaline earth oxides or other dopants such as $Nb_2O_5$ in $SrTiO_3$ or $Gd_2O_3$ in $CeO_2$.

The thickness of the metallic support layer comprising only the electronically conductive phase is preferably in the range of about 50 to about 2000 μm, more preferably about 100 to 1000 μm, such as 100 to 300 μm.

In one embodiment of the invention the surfactant is selected from the group consisting of anionic surfactants, non-ionic surfactants, cationic surfactants and zwitterionic surfactants. Preferably the surfactant is a non-ionic surfactant such as a surfactant under the mark Pluronic P123 (BASF).

In a further embodiment the precursor solution of ceria contains gadolinium (Gd). The gadolinium serves as dopant and results, after impregnation and calcination, in the formation of nano-sized CGO ($Ce_{1-x}Gd_xO_{2-\delta}$) particles covering the FeCrMx alloy and other surfaces initially present in the metallic support. Other suitable dopants include Sm, Y and Ca and mixtures thereof. Accordingly, the precursor solution of ceria may contain a dopant selected from the group consisting of Gd, Sm, Y, Ca and mixtures thereof.

Cerium oxide doped with divalent or trivalent cations has been shown in the literature, e.g. M. Mogensen et al., "Physical, Chemical and Electrochemical Properties of Pure and Doped Ceria," *Solid State Ionics*, 129 (2000), pp. 63-94, to have sufficiently high ionic conductivity to make it attractive for SOFC applications. Many dopants such as alkaline, rare-earth oxides and $Y_2O_3$ have high solubility in the Ce sub-lattice. Replacing $Ce^{4+}$ with +3 or +2 cations results in the creation of anion vacancy sites to compensate charges in the lattice. To increase conductivity, the selection of dopants may be important. The highest ionic conductivities are obtained in lattices without strain, i.e. where the ionic radius of the dopant is as close as possible to the "matching" radius, see e.g. M. Mogensen et. al., "Factors controlling the oxide ion conductivity of fluorite and perovskite structured oxides," *Solid State Ionics*, 174 (2004), pp. 279-286. We have found that Gd, Sm, Y and to some extent Ca are suitable dopants for ceria ($CeO_2$). The amount of dopant (Gd, Sm, Y, Ca) in the precursor solution of ceria is in the range of 5 to 50 wt %, preferably 10 to 40 wt %, depending on solubility and dopant.

By conducting the impregnation and calcination steps at least once, preferably up to five times, it is ensured that an increased amount of ceria penetrates and covers the FeCrMx alloy particles and other surfaces in the metallic support as well as the optional impregnation layer.

In order to keep the ceria crystallite particles below about 20 nm and to prevent oxide scale formation (corrosion) on the FeCrMx alloy, the calcination step is preferably conducted at temperatures of 650° C. or below, more preferably at 350° C. or below, such as 250° C. To ensure calcination the temperature is kept for hold times of 0.5 hr or more, preferably more than 1 hr, such as 3 hr or 5 hr or 10 hr. The calcination may be conducted in an oxygen environment, preferably in air (about 20% v/v oxygen), but other atmospheres are also suitable, for instance in a $H_2/N_2$ atmosphere, containing for instance 9% v/v $H_2$ with $N_2$ as balance). Lower grain size (crystallite size) of the in-situ formed ceria particles and thereby higher BET surface area is achieved with lower calcination temperatures, relatively short hold times and oxygen containing atmospheres. Hence, in a preferred embodiment the calcination step is conducted at 350° C. for 4 hr in air, whereby ceria particles of about 5 nm are formed. The smaller the ceria particles the finer becomes their dispersion in the metallic support and the optional impregnation layer of the anode. In addition, lower calcination temperatures, for instance at about 250° C. or lower, such as 200° C., can speed up the calcination procedure and thereby facilitate faster impregnation cycles meaning that multiple impregnations are possible within a smaller time scale. The time spent in the overall preparation process may then be reduced significantly.

The anode structure of the invention is superior to conventional metal-supported SOFCs having Ni—YSZ as the active anode structure. It has been surprisingly found that small amounts of metal catalysts in the range of a few wt %, specifically less than about 10 wt % of the anode weight in the metallic support may be used and results in further improvement of anode performance. Particularly, the provision of small amounts of nickel improves performance in terms of a higher electrochemical activity at temperatures between 500° C. and 850° C. It is believed that the ceria phase is still the main electro-catalytically active component, but Ni improves the catalytic performance to some extent by the removal and/or distribution of electrons to and from the ceria particles and the electronically conductive phase. The nickel precursor solution is preferably an aqueous solution of nickel for instance $Ni(NO_3)_2 \cdot 6H_2O$.

The amount of nickel in the Ni—CGO solution may be about 10 wt %, while CGO accounts for 2-3% of the resulting anode weight. The resulting anode includes the metallic support and the optional impregnation layer, as these are part of the anode side of a final cell but not the electrolyte. The amount of Ni in the resulting anode structure is advantageously 0.05-5.0 wt %, preferably 0.1-1.0 wt %, more preferably 0.1-0.5 wt %, most preferably 0.2-0.3 wt % with this latter range corresponding to the Ni—CGO solution of which Ni represents 10 wt % and in which CGO accounts for 2-3% of the total anode weight. This contrasts the anodes according to the prior art, where the amount of Ni in the resulting anode can be much higher, such as 40 wt % or even higher. High amount of Ni results in nickel particles which upon sintering coalesce and thereby create the nickel coarsening that is responsible for the higher degradation or loss of activity of cell during time. We have found that solid oxide fuel cells containing such low amounts of nickel withstand rapid heating and cooling in periods up to 20 hours at 800° C., exhibit higher performance than for instance state of the art Ni—YSZ supported cells, and not least exhibit degradation rates as low as about 4%/1000 h at about 650° C. By having small amounts of nickel the nickel particles are isolated from each other and rather work as a sort of catalytic aid centers in the CGO phase as described above. They do not coalescence into larger nickel particles or agglomerates. As a consequence not only performance but also durability performance of the cell is maintained for longer periods at a wide range of temperatures, particularly in the highly attractive range 500-850° C., an more particularly at temperatures about 650° C.

A precursor solution of Ni can also be made separately in a similar manner as the doped ceria solution by providing a nickel solution containing surfactant and solvent. The impregnation with the precursor solution of nickel can then be conducted as a separate step after the ceria impregnation.

During the process of preparation of the precursor solution of ceria containing a solvent and a surfactant, solutions containing cerium and gadolinium may be mixed first with a suitable solvent such as ethanol. For example ethanol solutions of cerium nitrate and gadolinium nitrate may be prepared separately. The surfactant, preferably Pluronic P123, may then be dissolved in the cerium nitrate solution or in a combined solution of cerium and gadolinium nitrate at for instance room temperature.

Two solutions can be made separately, one with the cerium and gadolinium nitrates and one with the Pluronic 123 surfactant. The solutions can be mixed when the species are completely dissolved in the solvents. Not only ethanol can be used as solvent; other solvents or mixtures of solvents that can dissolve the nitrates and the surfactant can be used for instance water.

The surfactant forms a gel that keeps the cerium and gadolinium together, which at the end renders a more homogeneous solution compared to solutions only consisting of individual phases of ceria and gadolinium oxide.

In order to improve the wetting of the precursor solution of ceria upon impregnation of the sintered structure, one or more additional surfactants may be added to the surfactant-ceria nitrate solution or surfactant-cerium and gadolinium nitrate solution. The one or more additional surfactant is preferably a non-ionic surfactant different from the first surfactant (Pluronic P123) such as Triton X-45 or Triton X-100.

It would be understood that after calcination, the ceria based oxide phase consists of a network of crystalline or semi-crystalline nano-sized crystallites, for instance in the range of 5 nm after calcination in air at 350° C. for 4 h. These crystallites cover the surface of the particles of the metallic support and the optional impregnation layer. This special surface structure in combination with the high electrical conductivity of the electronically conductive component is believed to cause the high electrochemical activity of the anode.

The FeCrMx alloy in the metallic support can be used as the current collector layer and/or it can be used as electrode support layer due to its high electrical conductivity.

Hence the term metal-supported SOFC.

When measured on button cells at open circuit voltage (OCV) in a two-atmosphere set-up, the electrochemical activity is maintained or even improved compared to the current metal-supported cells with Ni—YSZ as active fuel electrode in solid oxide fuel cell applications. Due to the apparently low activation energy of the electrode, around 0.5-0.7 eV, the performance is maintained at lower operating temperatures as well. In other words, the sensitivity to temperature changes is reduced and high performance is kept at a wide range of temperatures, particularly in the range 650-850° C. and even in the highly attractive range 500-850° C.

The various manufacturing techniques currently used for fabricating electrodes for solid oxide fuel cells, or similar applications can be used. The novel composite anode structure may supplement or replace currently used fuel electrodes (anodes) in solid oxide fuel cells (SOFC) and cathodes in solid oxide electrolysis cells (SOEC). The invention encompasses therefore solid oxide fuel cells (SOFC) comprising the anode structure of the invention as set out in claim 10. Thus, when used in SOFC the anode structure itself does not contain the electrolyte. Of course, in order to have a SOFC apart from the anode structure itself of claim 1, an electrolyte and a cathode layer are also required. A SOFC stack may then be assembled which comprises a plurality of such SOFCs.

The anode structure of the invention may be used as electrode in other applications than fuel cells where the anode (and cathode) may work differently than in fuel cells. Such applications include electrolysis cells and separation membranes. We provide therefore also the use of the anode structure prepared according to the invention as electrode in electrolysis cells, oxygen separation membranes, hydrogen separation membranes and electrochemical flue gas cleaning cells as set out in claim 11.

In particular the anode structure may be used as electrode in solid oxide electrolysis cells (SOEC), where such electrode actually acts as the cathode (hydrogen electrode). As described previously, the provision of the electrolyte as defined in claim 2 is one extra step towards a full electrochemical device such as a solid oxide fuel cell (SOFC) and solid oxide electrolysis cell (SOEC); what is missing is simply another electrode on the other side of the electrolyte.

BRIEF DESCRIPTION OF THE DRAWINGS

FIG. 10A shows a SEM image of the cross section of the symmetrical cell consisting of Ni—CGO20 (10 wt % Ni with respect to CGO20) before impregnation. IL=impregnation layer, E=electrolyte.

FIG. 10B shows a SEM image of a cross section of the impregnated impregnation layer after test of the symmetrical cell. Maximum test temperature was 750° C.

DETAILED DESCRIPTION OF THE INVENTION

Figure 1:
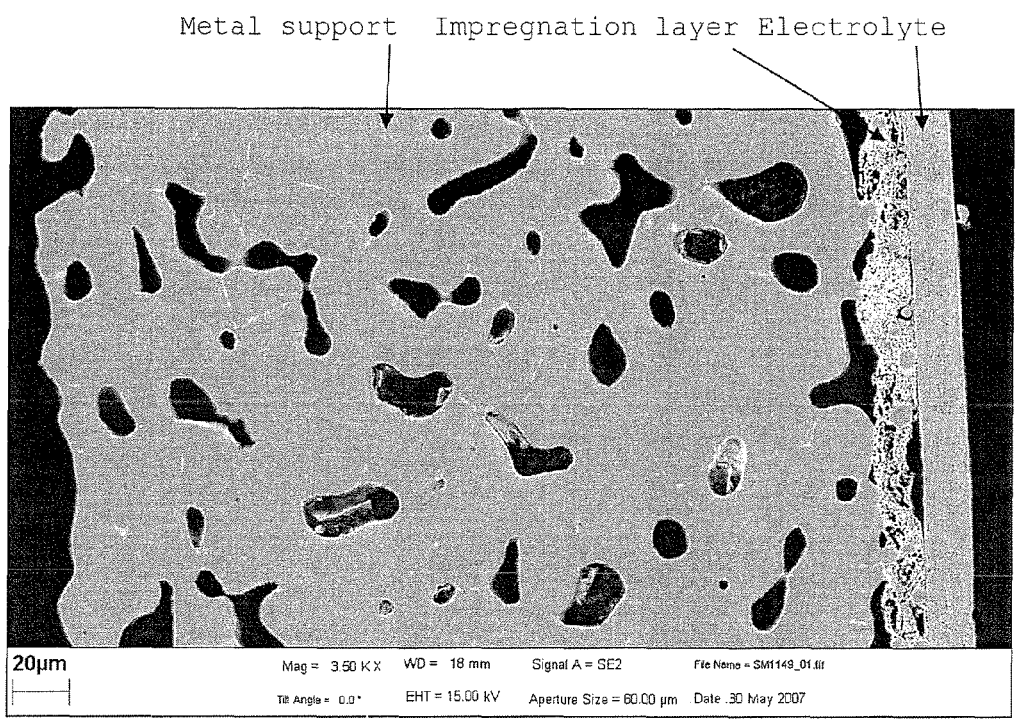
FIG. 1 shows a Scanning Electron Microscopy (SEM) image of a metal supported half-cell, i.e. without cathode, with impregnated ceria obtained according to the invention.

FIG. 1 shows an image of a half-cell (without cathode) obtained according to the invention in which electrolyte (YScSZ) is applied directly on top of the metallic support consisting of stainless steel (FeCr(350N) with an impregnation layer between the electrolyte and the stainless steel layer. The impregnation layer consists of a cermet with about 50 vol % CGO ($Ce_{0.9}Gd_{0.1}O_{2-\delta}$) and 50 vol % stainless steel in an approximately 20 µm thick layer in contact with the electrolyte. The half cell was impregnated five times with the ceria precursor solution with subsequent calcinations between each impregnation.

Figure 2:
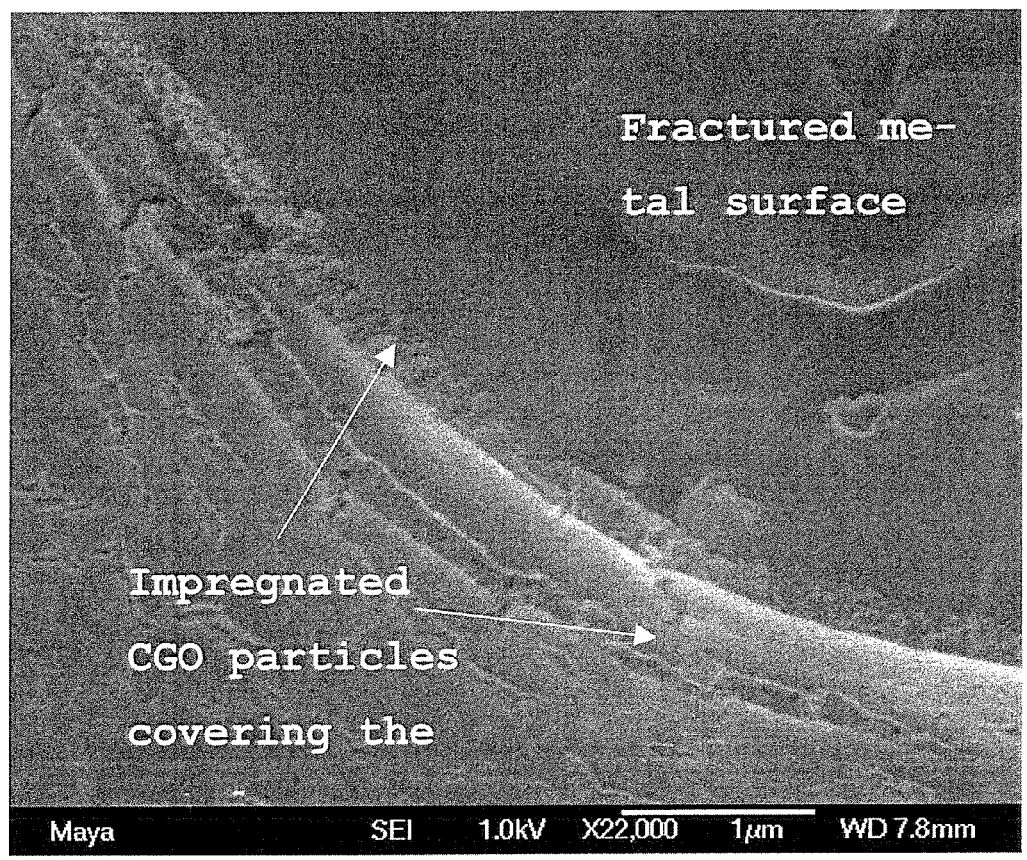
FIG. 2 shows a high magnification SEM image of a fractured cross-section of a metal supported half-cell with impregnated ceria obtained according to the invention.

The stainless steel acts as the electronically conductive phase in the metallic support. The initial CGO component in the impregnation layer is present to improve the attachment of the stainless steel to the electrolyte and to facilitate the subsequent impregnation with ceria by having improved porosity close to the electrolyte. The CGO composite structure improves also the ionic conductivity close to the electrolyte. The impregnated ceria solution, which after calcination forms nano-sized crystals of CGO covering the surfaces of the entire metallic support structure (see FIG. 2) and impregnation layer acts as the electrocatalytically active material. The initial CGO component in the impregnation layer might also have some electrocatalytic performance although the greater contribution stems from the much smaller particles (crystals) of the impregnated nano-sized ceria phase.

Figure 3:
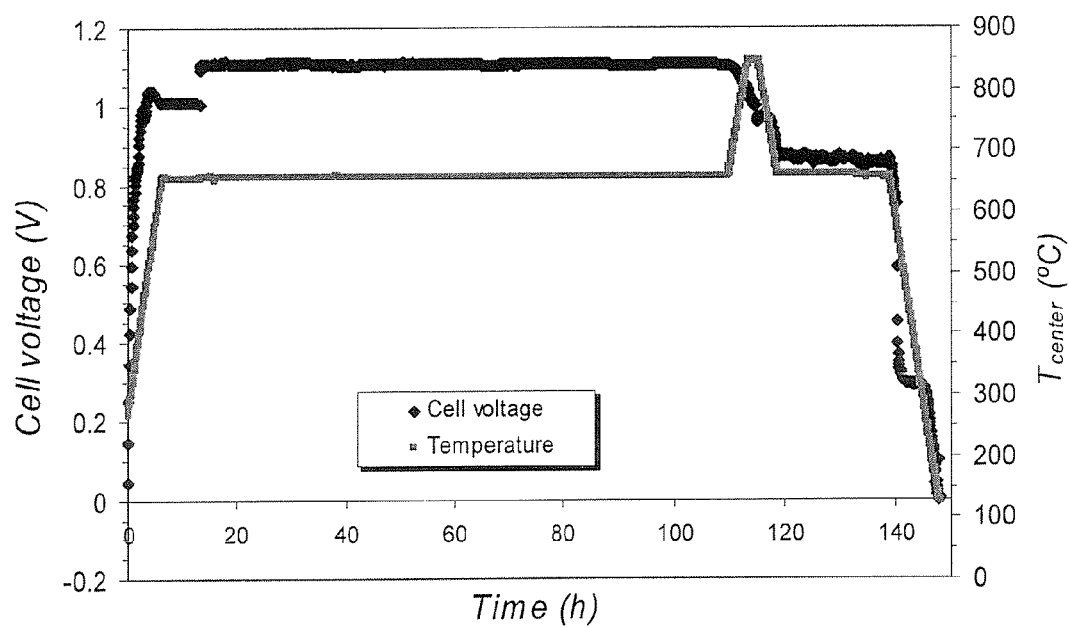
FIG. 3 shows a test history plot of a button cell comprising the anode structure of FIG. 1.

A button cell, 2×2 cm with active area about 0.5 cm² sprayed with a composite un-sintered cathode containing CGO i.e. $(La_{0.6}Sr_{0.4})_{0.99}Co_{0.2}Fe_{0.8}O_3$—$Ce_{0.9}Gd_{0.1}O_{2-\delta}$ (50:50), was investigated as a fuel cell in a two atmosphere set-up. The button cell contains therefore both the anode structure as shown in FIG. 1 and a cathode. The cell voltage was measured as a function of time during the whole test. The cell voltage is shown in FIG. 3. The cell was heated with humidified 9% $H_2$/Ar on the anode side and air on the cathode side. The fuel gas was switched to humidified $H_2$ after around 13 h. The results in FIG. 3 show that the cell has a good stability during the test at 650° C. where the cell was left at open circuit voltage for 4 days.

Figure 4:
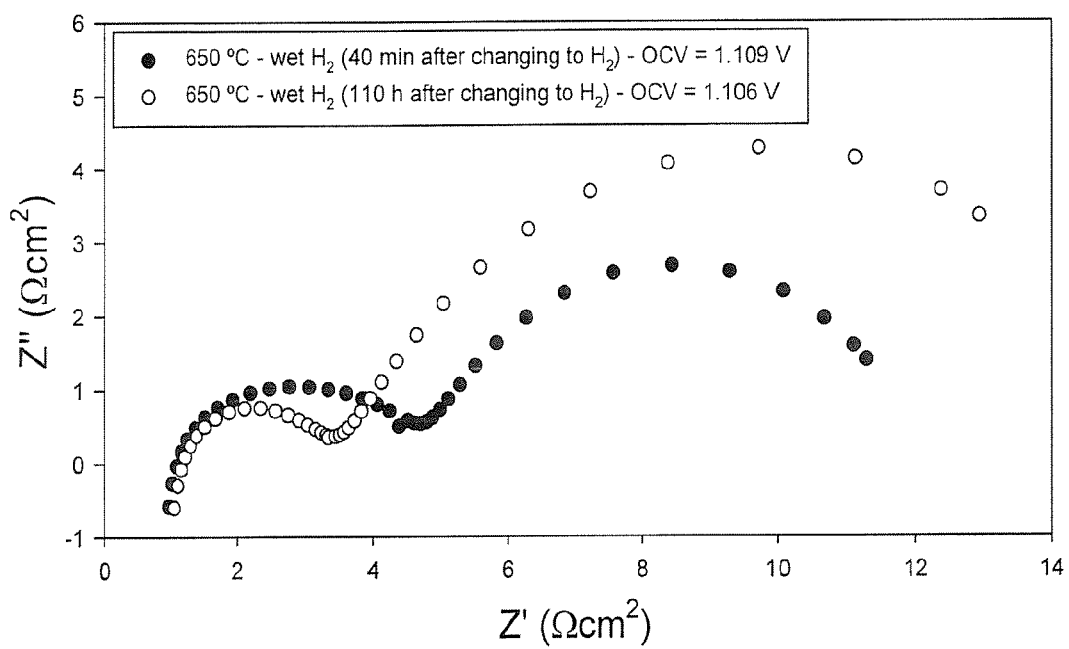
FIG. 4 shows electrical impedance spectroscopy (EIS) spectra at 650° C. at the start and end of the test period.
Figure 5:
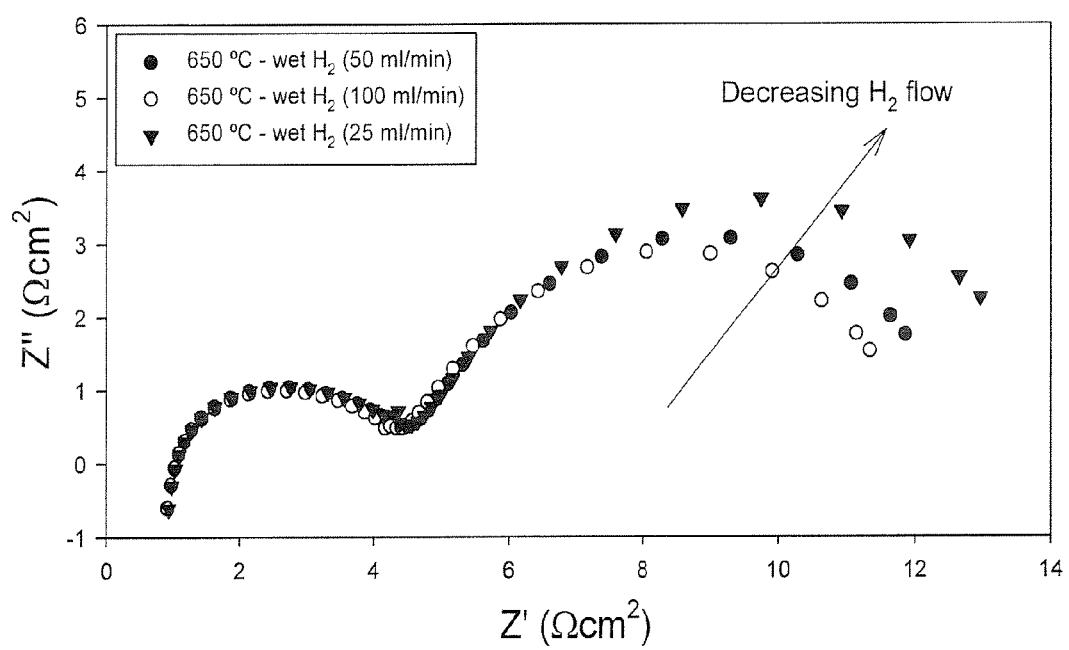
FIG. 5 shows electrical impedance spectroscopy (EIS) spectra at 650° C. at the start of the test period with different $H_2$ flows illustrating the problem with diffusion in the low frequency arc.

Electrical impedance spectra of the button cell recorded at 650° C. in humidified $H_2$, approximately 3% $H_2O$, at the beginning of the test showed a large low frequency arc as depicted in the right-hand side of FIG. 4. This low frequency region is believed to be caused by diffusion problems and independent of the electrode performance; see FIG. 5.

Figure 6:
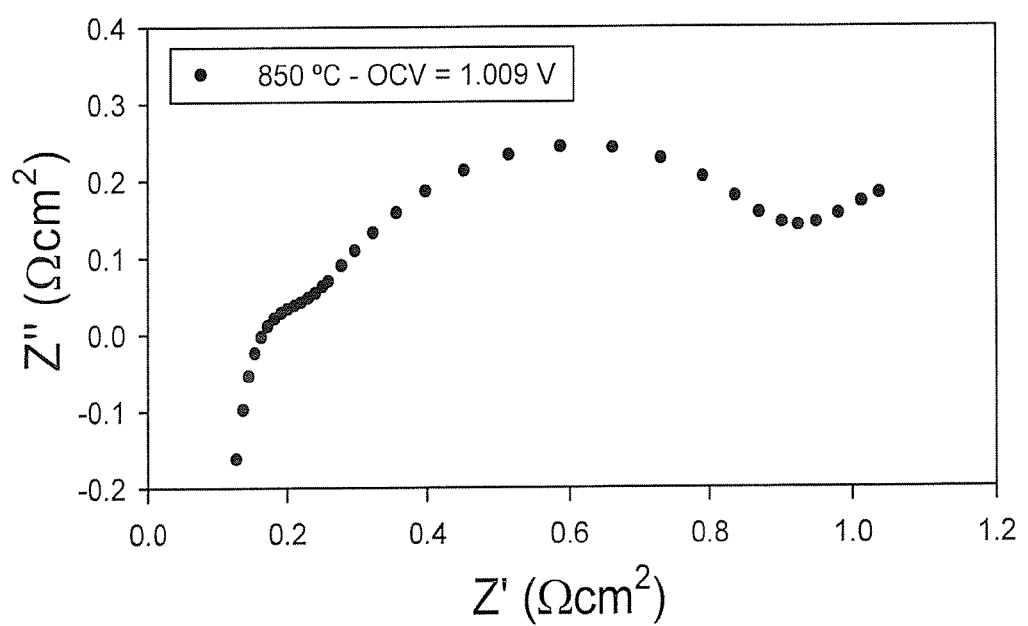
FIG. 6 shows electrical impedance spectroscopy (EIS) spectra at 850° C.

Since electrode performance is mainly related to the high frequency region, it was found that the polarization resistance ($R_P$) at 650° C. was initially about 4 $\Omega cm^2$ and decreased during testing to about 2.5 $\Omega cm^2$, while the ohmic serial resistance from the electrolyte ($R_S$) at 650° C. was relatively stable with time. It only increased from about 1.08 $\Omega cm^2$ to 1.15 $\Omega cm^2$ during the test period at 650° C. An electrical impedance spectra was also recorded at 850° C., which is shown in FIG. 6. The polarization resistance ($R_P$) at high frequency was approximately 0.8 $\Omega cm^2$ and $R_S$=0.16 $\Omega cm^2$. This results in an approximate activation energy for $R_P$ and $R_S$ of 0.6±0.1 eV and 0.88±0.05 eV, respectively. Hence, high electrochemical activity (low $R_P$) at a wide range of temperatures (650-850° C.) is obtained and at the same time there is no electrolyte rupture due to undesired expansion of the anode.

The polarization resistance results shown above are conservative because the measurements were performed on a button cell containing both the anode structure of the invention and a cathode. Thus, the polarization resistance is a combination of the resistance from both electrodes. The polarization resistance from the cathode is relatively large because the cathode composite $(La_{0.6}Sr_{0.4})_{0.99}Co_{0.2}Fe_{0.8}O_3$—$Ce_{0.9}Gd_{0.1}O_{2-\delta}$ (50:50) was un-sintered when the measurements started and it was calcined/sintered in-situ at the operating temperature.

Another button cell (2×2 cm with an active area of 0.5 cm²) has been tested resulting in high performance. With hydrogen as fuel at 650° C. the cell yields a performance similar or even better to that of a state-of-the-art Ni—YSZ supported cell. The metal-supported cell in this example consists of (see FIG. 7): i) a metal support (MS) containing FeCr(433) stainless steel and 5 vol % YSZ, 350 µm thick. ii) An impregnation layer (IL) comprising FeCr(433) stainless steel and 50 vol % YSZ, 40 µm thick. iii) ScYSZ-based electrolyte (E) and iv) a screen-printed (green) LSCF:CGO composite cathode. Before applying the cathode, the anode side was infiltrated twice with a surfactant assisted nitrate solution of Ni—CGO20 (10 wt % Ni with respect to CGO20). CGO accounts for about 10 wt % of the resulting anode. The impregnated half cell was calcined at 350° C. for 2 h between each impregnation and before the cathode was applied.

Figure 8:
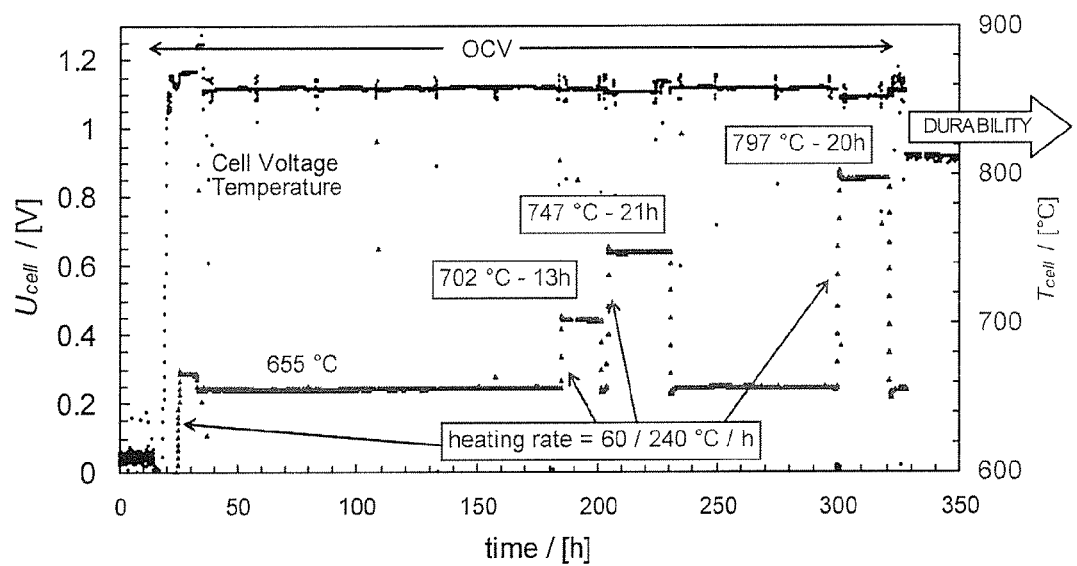
FIG. 8 shows the cell voltage history, initial phase of test of the cell of FIG. 7.

The cell was subjected to periods at higher temperatures, in order to explore the effects of heating on cell performance and stability. FIG. 8 shows the cell voltage history of the test in the initial phase when the cell was held at open-circuit voltage, OCV. The initial testing showed that the cell withstands rapid heating/cooling (by 240° C. h⁻¹) and that the cell endures heating to ~800° C. The cell voltage was near the theoretical cell voltage was stable and did not indicate any significant increase in leakage/gas crossover after the temperature excursions.

The cell performance is summarized in the following table which shows the area specific resistance (ASR) obtained at 655° C. and 749° C. with a fuel composition of 4% $H_2O$ and balance $H_2$ with pure oxygen as the oxidant. The ASR values are given at a cell voltage of 0.6V.

| ASR at 0.6 V/ ($\Omega \cdot cm^2$) 655° C., 4% $H_2O$ | ASR at 0.6 V/ ($\Omega \cdot cm^2$) 749° C., 4% $H_2O$ |
|---|---|
| 0.54 | 0.26 |

Figure 9:
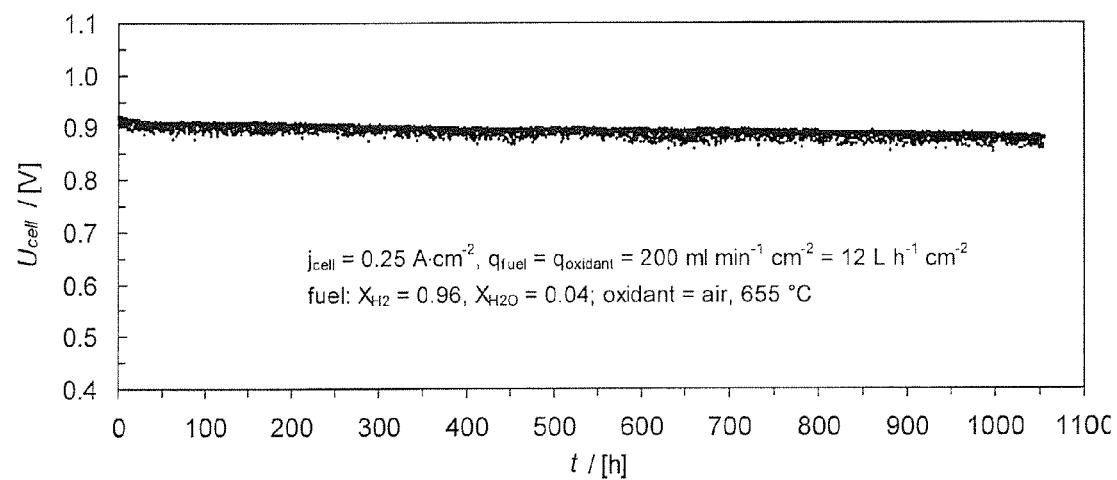
FIG. 9 shows the Cell Voltage History, durability testing at 0.25 A/cm² of the cell of FIG. 7.

The durability of the cell was tested galvanostatically at 0.25 A $cm^{-2}$ and 655° C. The cell voltage history during the durability test is shown in FIG. 9. The degradation rate observed was 4.2%/1000 h based on the change in cell voltage. In summary, this cell test shows that the cell design and impregnation procedure of the invention leads to cells that withstands rapid heating/cooling, that endures periods of up to 20 h at 800° C., that performs significantly better than Ni—YSZ supported SOFC at 650° C., and that exhibits degradation rates below 5%/1000 h at an operating temperature of 655° C.

Symmetrical Cell Results:

Measurements were also conducted on symmetrical cells consisting of Ni—CGO20 (10 wt % Ni with respect to CGO20) impregnated impregnation layers (similar IL and impregnation procedure as described previously) on thick electrolyte. This has been done to try to evaluate the contribution of the anode to the whole cell resistance as measured on button cells described previously. The symmetrical cell with IL-E-IL is shown in FIG. 10A. The electrodes have been infiltrated twice with a surfactant assisted nitrate solution of Ni—CGO20 (10 wt % Ni), i.e. the same solution used on the anode in the button cells described above. The impregnated phase after test in humidified $H_2$ is shown in FIG. 10B.

The electrode polarization resistance ($R_P$) on symmetrical cells has been characterized by electrochemical impedance spectroscopy (EIS) in a one-atmosphere set-up. Measurements have been conducted between 500-800° C. in various atmospheres with water-saturated (at ambient temperature) $H_2/N_2$ gas mixtures. The polarization resistance ($R_P$) of an impregnated anode of the invention has been measured to be 0.119 $\Omega cm^2$ and 0.057 $\Omega cm^2$ in humidified hydrogen (approximately 3% $H_2O$) at 650° C. and 750° C., respectively. The results show that the anode has an excellent performance at a broad range of temperatures which furthermore demonstrates the usefulness of the invention to improve performance in fuel electrodes for metal-supported SOFCs.

EXAMPLES

Example 1

The following procedure was used to fabricate the infiltration solution which was used to fabricate a metal-supported cermet SOFC anode.

1. An ethanol solution (10 g ethanol) containing 0.8 moles/liter cerium nitrate and 0.2 moles/liter gadolinium nitrate was prepared.
2. 1 g Pluronic P123 surfactant was dissolved in the nitrate solution at room temperature.
3. (Optional) Two solutions are made separately. One with the cerium and gadolinium nitrates and one with the Pluronic P123 surfactant. The solutions are mixed when the species are completely dissolved in ethanol.
4. (Optional) Extra surfactant (e.g. Triton X-45 or Triton X-100) is added to improve the wetting of the infiltration solution. In one experiment approximately 0.3 g Triton X-100 was added to the nitrate and Pluronic P123 solution.
5. A metallic support layer comprising a porous, electronically conductive phase is fabricated. The electronically conductive phase consists of a FeCrMx alloy (FeCr (350N)).
6. A slurry of the electronically conductive phase was made by dispersing powder of stainless steel and other additives such as pore formers. A binder was added after dispersion and the slurry was tape-casted.
7. On the tape-casted structure an electrolyte layer of ScYSZ is applied by spraying. After spray painting of the electrolyte layer the half cell was sintered in a mixture of $H_2$/Ar at 1200-1300° C., forming a metallic support comprising the electronically conductive phase (stainless steel) and the electrolyte.
8. After the anode metallic support has been fabricated, the prepared infiltration solution of ceria is impregnated into the open porosities of the anode metallic support. The infiltration is made under vacuum.
9. After infiltration the cell is calcined at 350° C. in air. The heat treatment removes the surfactant and forms the desired oxide ($Ce_{1-x}Gd_xO_{2-\delta}$).
10. (Optional) Steps 8-9 are repeated multiple times to get an increased amount of doped cerium oxide phase.

Example 2

Same as Example 1 but where the metallic support (stainless steel) also contains initially an additional oxygen ion conducting phase of yttrium stabilized zirconia (YSZ): 20 vol % 50/50 1 μm/7 μm YSZ).

Example 3

Same as Example 1 or Example 2 (steps 1-6, 8-10) but before the electrolyte layer is applied, an impregnation layer about 20 μm thick is provided between the metallic support and the electrolyte. Here, the impregnation layer comprises about 50 vol % CGO ($Ce_{1-x}Gd_xO_{2-\delta}$), and 50 vol % electronically conductive component (FeCr(350N)).

Example 4

Figure 7:
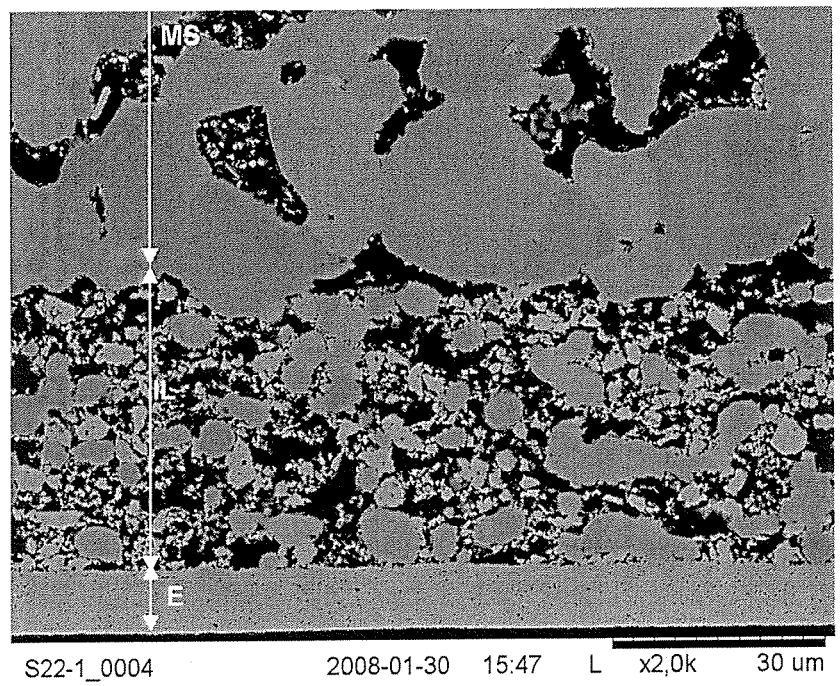
FIG. 7 shows a SEM image of a half cell before impregnation and without cathode according to Example 4.

Fabrication of the structure of FIG. 7-9 (half cell without cathode):

The following procedure was used to fabricate the infiltration solution which was used to fabricate a metal-supported cermet SOFC anode.

1. A water solution (10 g water) containing 2.4 moles/liter cerium nitrate and 0.6 moles/liter gadolinium nitrate was prepared together with nickel nitrate. The amount of nickel nitrate corresponded to 10 wt % Ni with respect to CGO20.
2. 1 g Pluronic P123 surfactant was dissolved in the nitrate solution at room temperature.
3. A metallic support layer comprising a porous, electronically conductive phase is fabricated. The metallic support layer also contains 5 vol % YSZ. The electronically conductive phase consists of a FeCrMx alloy (FeCr (433)).
4. A slurry for the preparation of the metallic support was made by dispersing powder of stainless steel and YSZ and other additives such as pore formers. A binder was added after dispersion and the slurry was tape-casted.
5. An impregnation layer comprising a porous, electronically conductive phase is fabricated. The impregnation layer comprise 50 vol % YSZ. The electronically conductive phase consists of a FeCrMx alloy (FeCr(433)).

6. A slurry for the preparation of the impregnation layer was made by dispersing powder of stainless steel and YSZ and other additives such as pore formers. A binder was added after dispersion and the slurry was tape-casted.
7. The two tape-casted layers of 4 and 6 were put together using a lamination procedure. On the laminated structure a tape-casted electrolyte layer of ScYSZ, is applied by lamination. After lamination of the electrolyte layer the half cell was sintered in a mixture of $H_2/Ar$ at 1200-1300° C. forming an anode metallic support comprising the electronically conductive phase (stainless steel), impregnation layer and the electrolyte.
8. After the anode metallic support has been fabricated, the prepared infiltration solution of ceria and nickel is impregnated into the open porosities of the anode metallic support. The infiltration is made under vacuum.
9. After infiltration the cell is calcined at 350° C. in air. The heat treatment removes the surfactant and forms the desired oxide(s) ($Ce_{1-x}Gd_xO_{2-\delta}$/NiO).
10. (Optional) Steps 8-9 are repeated multiple times, in this case twice to get an increased amount of doped cerium oxide/NiO phase.

What is claimed is:

1. A cermet anode structure obtained by a process comprising the steps of:
   (a) providing a slurry by dispersing a powder of an electronically conductive phase and by adding a binder to the dispersion, in which said electronically conductive phase comprises
   a FeCrMx alloy, wherein Mx is selected from the group consisting of Ni, Ti, Nb, Ce, Mn, Mo, W, Co, La, Y, Al, and mixtures thereof, and
   niobium-doped strontium titanate, vanadium-doped strontium titanate, tantalum-doped strontium titatane, and mixtures of any of the foregoing,
   (b) forming a metallic support of said slurry of the electronically conductive phase,
   (c) providing a precursor solution of ceria, said solution containing a solvent and a surfactant,
   (d) impregnating the structure of step (b) with the precursor solution of step (c),
   (e) subjecting the resulting structure of step (d) to calcination,
   (f) conducting steps (d)-(e) at least once, the process further comprising combining the precursor solution of ceria with a nickel precursor solution and wherein the total amount of nickel in the resulting anode is 10 wt % or below.

2. A cermet anode structure obtained by a process comprising the steps of:
   (a) providing a slurry by dispersing a powder of an electronically conductive phase and by adding a binder to the dispersion, in which said electronically conductive phase comprises a FeCrMx alloy, wherein Mx is selected from the group consisting of Ni, Ti, Nb, Ce, Mn, Mo, W, Co, La, Y, Al, and mixtures thereof,
   (b) forming a metallic support layer of said slurry of the electronically conductive phase,
   (c) forming an electrolyte on the structure of step (b) and sintering the obtained structure,
   (d) providing a precursor solution of ceria, said solution containing a solvent and a surfactant,
   (e) impregnating the resulting sintered structure of step (c) with the precursor solution of step (d),
   (f) subjecting the structure of step (e) to calcination, and
   (g) conducting steps (e)-(f) at least once, the process further comprising combining the precursor solution of ceria with a nickel precursor solution and wherein the total amount of nickel in the resulting anode is 10 wt % or below.

3. Anode structure according to claim 1, wherein the electronically conductive phase in step (a) also contains initially an additional oxygen ion conducting phase, or mixed oxygen ion and electronically conducting phase.

4. Anode structure according to claim 1, in which step (b) further comprises providing an impregnation layer wherein said impregnation layer consists of an electronically conductive phase, or an oxygen ion conducting phase, or a mixed conducting phase, or mixed conducting phase in combination with an electronically conductive phase, or an oxygen ion conducting phase in combination with an electronically conductive phase.

5. Anode structure according to claim 1 wherein the surfactant is selected from the group consisting of anionic surfactants, non-ionic surfactants, cationic surfactants and zwitterionic surfactants.

6. Anode structure according to claim 1, wherein the precursor solution of ceria contains a dopant selected from the group consisting of Gd, Sm, Y, Ca and mixtures thereof.

7. Anode structure according to claim 1, wherein the impregnation and calcination steps are conducted up to five times.

8. Anode structure according to claim 1, wherein the calcination step is conducted at a temperature of 250° C. or below.

9. Anode structure according to claim 1, wherein the total amount of nickel in the resulting anode is 0.05-5.0 wt %.

10. Solid oxide fuel cell comprising an anode structure according to claim 1.

11. A process of manufacturing electrolysis cells, oxygen separation membranes, hydrogen separation membranes, or electrochemical flue gas cleaning cells comprising the steps of:
   (1) providing an electrode, the electrode comprising an anode of claim 1, and
   (2) manufacturing the electrolysis cells, oxygen separation membranes, hydrogen separation membranes, or electrochemical flue gas cleaning cells with the electrode.

* * * * *